(No Model.)
F. J. & G. W. JONES.
MEANS FOR CLOSING LEAKS IN PNEUMATIC TIRES.
No. 587,211. Patented July 27, 1897.
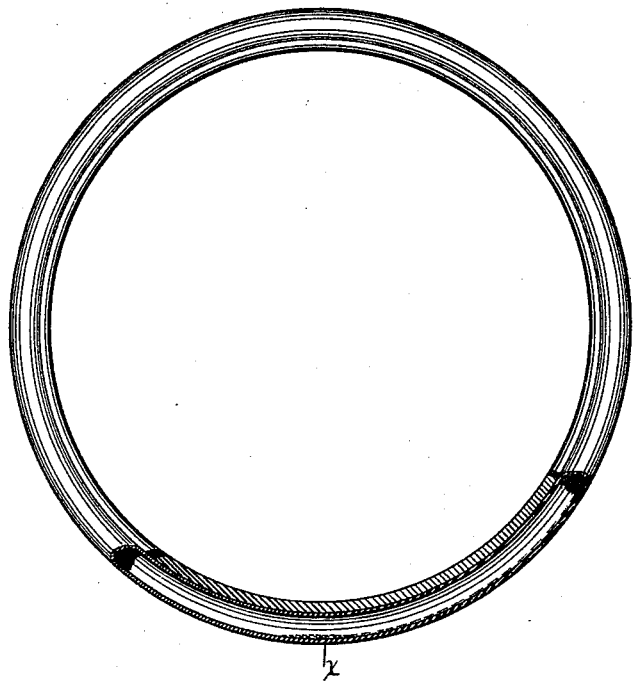

UNITED STATES PATENT OFFICE.

FREDERICK JOSIAH JONES AND GWENDOLEN WEYNTON JONES, OF KINGS HEATH, ENGLAND, ASSIGNORS TO THE TYRE PUNCTURE CURING SYNDICATE, LIMITED, OF LONDON, ENGLAND.

MEANS FOR CLOSING LEAKS IN PNEUMATIC TIRES.

SPECIFICATION forming part of Letters Patent No. 587,211, dated July 27, 1897.

Application filed March 1, 1897. Serial No. 625,659. (No model.)

*To all whom it may concern:*

Be it known that we, FREDERICK JOSIAH JONES, civil engineer, and GWENDOLEN WEYNTON JONES, spinster, residing at Brentwood, Stanley Road, Kings Heath, in the county of Worcester, England, subjects of the Queen of Great Britain, have invented certain new and useful Improvements in Closing Leaks in Pneumatic Tires and other Inflatable Rubber Articles, of which the following is a specification.

The accompanying drawing shows a pneumatic tire partly broken away to illustrate how the sealing liquid which we employ is applied to the interior thereof.

The object of this invention is to provide means for closing up slight leakages in rubber articles, such as pneumatic tires, whether arising from the porosity of the rubber or from punctures. We employ a chemical compound which when distributed over the interior of pneumatic tires of cycles and vehicles or other inflated articles of rubber closes up tightly leakages of all kinds.

In carrying out our invention we employ dissolved pyroxylin rendered non-hardening by the addition of glycerin, treacle, or other suitable non-drying medium to act as a vehicle to hold the dissolved pyroxylin in suspension. Care should be taken that the resulting liquid is not harmful to india-rubber.

When the compound is distributed over the interior of the inflated article, a non-drying elastic skin is formed, which closes the pores in the rubber or forms a plug in case of a puncture.

As an example of the material employed, a suitable compound consists approximately of ten grains of pyroxylin dissolved in one and one-half ounces each of amyl acetate and amyllic alcohol and mixed intimately with twelve ounces of glycerin. Although we find the above proportions suitable in most cases we do not confine ourselves to them, but may vary the quantities to suit the purposes for which they are required and the quality of the ingredients used. Thus the different solvents of the pyroxylin which may be used would require different proportions of the non-drying media.

In carrying out this invention a tire, for example, is taken, and enough of the compound is introduced into it to cover the entire surface and to leave a small quantity over in it, as indicated at $x$ in the accompanying drawing. When the tire is punctured, the compound fills up the hole and becomes semisolid therein by the evaporation of the solvent. The air in the article does not impair the liquid employed, as this air soon becomes saturated with the solvent vapor, and after that the solvent does not evaporate until a puncture occurs. The pyroxylin employed is the active agent in our compound. The solvent is extremely volatile, and it vaporizes as soon as exposed to the air, leaving the pyroxylin to quickly harden. The glycerin, treacle, or the like prevents the too rapid evaporation of the solvent, and as it moves around with the tire keeps the skin formed on the interior of the tire from hardening—that is to say, the glycerin keeps the skin soft, so that when a puncture occurs the compound may fill the puncture to seal it.

The stopper or seal formed by the pyroxylin compound is not affected by water. It therefore differs from a seal or stopper made of glue, flour paste, and the like, which is readily soluble in water. Even when a thorn or nail pierces the tube the sealing liquid will harden around the thorn or nail and prevent the escape of air, the thorn or nail merely acting as a part of the plug or seal.

We claim as our invention—

1. An inflated rubber article having within it a sealing agent of dissolved pyroxylin rendered non-hardening by the addition of a non-drying medium.

2. An inflated rubber article having within it a sealing agent of pyroxylin dissolved in amyl acetate and amyllic alcohol, with the addition of glycerin, treacle, or the like.

FREDERICK JOSIAH JONES.
GWENDOLEN WEYNTON JONES.

Witnesses:
G. PEARSALL LACKER,
ALBERT NEWEY.